Feb. 20, 1962   L. J. BOLER ET AL   3,021,670
MACH NUMBER CONTROL DEVICE
Filed March 24, 1958   2 Sheets-Sheet 1
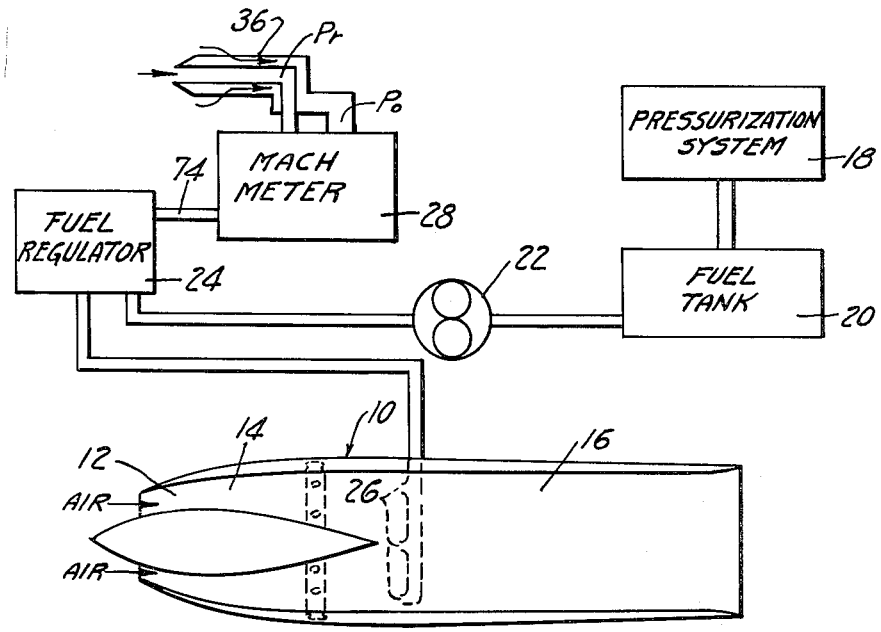
FIG.1
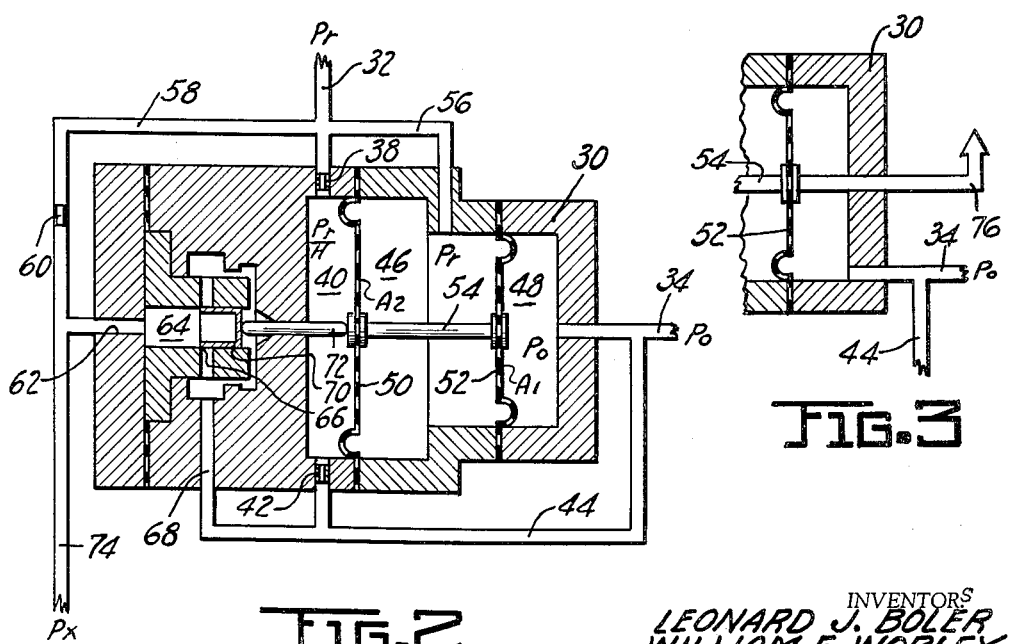
FIG.2
FIG.3
INVENTORS
LEONARD J. BOLER
WILLIAM E. WORLEY
BY
William N. Antonis
ATTORNEY INVENTORS
LEONARD J. BOLER
WILLIAM E. WORLEY
BY
William N. Antonis
ATTORNEY United States Patent Office 3,021,670
Patented Feb. 20, 1962

3,021,670
MACH NUMBER CONTROL DEVICE
Leonard J. Boler and William E. Worley, Mishawaka, Ind., assignors to The Bendix Corporation, a corporation of Delaware
Filed Mar. 24, 1958, Ser. No. 723,515
7 Claims. (Cl. 60—35.6)

This invention relates to airborne craft such as airplanes and guided missiles designed for supersonic flight and more particularly to Mach number control and indicating devices for such aircraft.

Aircraft designs are based to some extent on considerations of maximum permissible actual speed, the limitation in speed being represented by a factor known as the Mach number. This number, which represents the ratio of the actual speed of the aircraft to the speed of sound in the atmosphere in which the aircraft is flying, is of exceedingly great importance to the pilot and/or the engineers interested in the design, operation and characteristics of crafts intended for such supersonic flight.

It can be said that speed control is important in preventing airframe destruction due to a run-away engine, in obtaining peak engine performance, and in improving control over the craft in question. In order to achieve these objectives it is, therefore, desirable to provide controls for limiting the propulsive thrust developed by the power plant of the aircraft to avoid exceeding the design Mach number.

Accordingly, it is an object of this invention to provide a device capable of maintaining the speed of an aircraft at a predetermined Mach number.

Another object of this invention is to provide a device capable of maintaining the speed of an aircraft at a predetermined Mach number with a precision which is independent of the altitude of the controlled aircraft.

More specifically, it is an object of this invention to provide a fuel control for the propulsive engine of an airborne craft which senses and responds to the Mach number of the craft and regulates the fuel supplied to the engine accordingly. The fuel control system may be manually or automatically adjusted to a preselected Mach number setting and will thereafter sense or "read" the Mach number of the craft and regulate the delivery of fuel to the engine in accordance therewith, so that a flight Mach number can be maintained which corresponds to the preselected setting. Such a device will operate to reduce the supply of fuel to the engine of the aircraft when said Mach number exceeds a predetermined value and increase the supply of fuel when said Mach number falls below said predetermined value.

Another object of this invention is to provide a practical, effective, and dependable device or means for accurately determining and/or indicating the Mach number of aircraft traveling at supersonic speeds.

An important object of this invention is to provide a Mach number unit in which the control Mach number may be programmed or varied with altitude or atmospheric pressure.

A further object of this invention is to provide a novel pressure ratio sensing device for determining Mach number which provides equal sensitivity at all altitudes.

A still further object of this invention is to provide a novel pressure ratio sensing device the components of which do not have inherent spring rates.

The above and other objects and features of the invention will be apparent from the following description of the device taken in connection with the accompanying drawings which form a part of this specification and in which:

FIGURE 1 is a schematic drawing of a ram jet engine showing various components of the fuel system attached thereto;

FIGURE 2 is a sectional view of the Mach number control device;

FIGURE 3 is a sectional view of a portion of the Mach number control device showing one way of attaching a visible indicator thereto;

Figure 4:
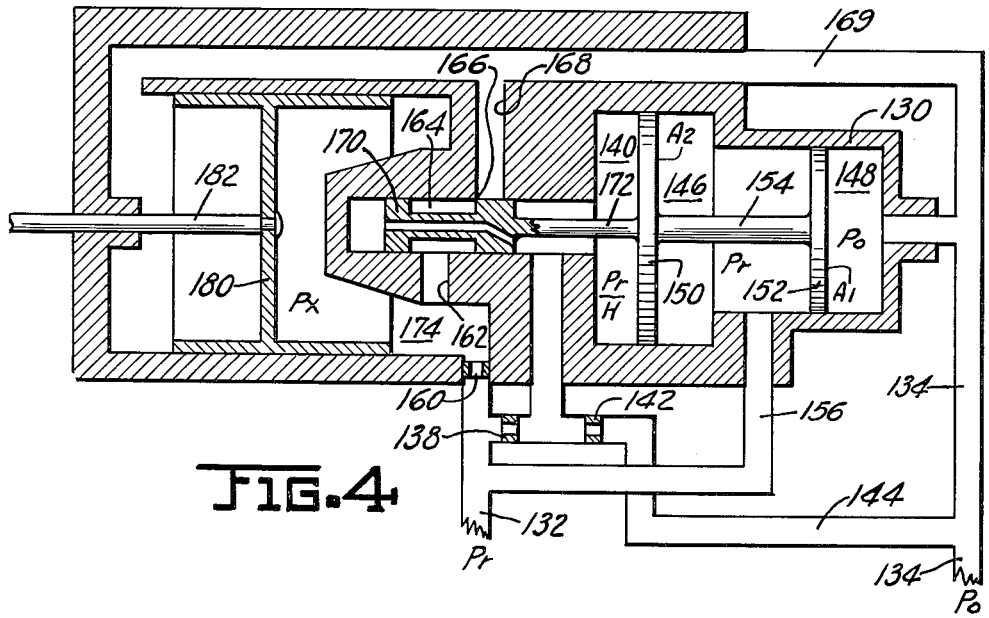
FIGURE 4 is a sectional view of another embodiment of the Mach number control device shown in conjunction with the pneumatic circuit of the fuel regulator which controls delivery of fuel to the ram jet engine.

Referring to FIGURE 1 of the drawings it will be seen that a ram jet engine designated by the numeral 10 includes an inlet 12 leading past the diffuser section 14 into a combustion chamber 16. The fuel system includes a pressurization system 18 for pressurizing the fuel in fuel tank 20, a fuel pump 22, a fuel regulator 24 which communicates with fuel injectors 26 in the combustion chamber 16, and a Mach meter 28 for controlling the action of the fuel regulator 24.

The Mach number control device 28 includes a housing 30 connected to a ram pressure source ($P_r$) and a static or atmospheric pressure source ($P_0$) through conduits 32 and 34 which communicate with pitot tube 36. A first fluid flow passage connected between the ram pressure source and atmospheric pressure source includes conduit 32, a first orifice or retriction 38 having a predetermined fixed effective flow area, chamber 40, a second orifice or restriction 42 having a predetermined fixed effective flow area, conduit 44, and conduit 34. Within housing 30 is a pressure ratio sensing means which includes three variable volume chambers 40, 46 and 48, and two pressure responsive diaphragms 50 and 52, the first of which is located between chambers 40 and 46, and the second of which is located between chambers 46 and 48. A connecting rod 54 connects diaphragm 50 to diaphragm 52 so that the two diaphragms will move in unison. Since sonic flow occurs through restrictions 38 and 42, the pressure ($P_r/H$) in chamber 40 will be a percentage of ram pressure, said percentage being dependent upon the preselected fixed flow areas of consecutive restrictions 38 and 42. The value of "H" will vary for different flow area ratios of two restrictions in series, but will remain constant for a predetermined fixed flow area ratio. Thus in the instant situation "H" will vary as a function of the area ratio of the two restrictions 38 and 42 and may be defined in terms of the following equation:

$$H = (f)\frac{A_{38}}{A_{42}}$$

wherein $A_{38}$ is the area of restriction 38 and $A_{42}$ is the area of restriction 42. The pressure in chamber 46 is equal to ram pressure ($P_r$) since it communicates with the ram pressure source via conduit 56, and the pressure in chamber 48 will be equal to atmospheric pressure ($P_0$), since it is in communication with the atmospheric pressure source via conduit 34. The ratio of the area ($A_2$) of diaphragm 50 to the area ($A_1$) of diaphragm 52 may easily be calculated if the percentage of ram pressure ($P_r/H$) to be used and the design Mach number ($M_0$) are both known. The area $A_2$ of the diaphragm is always greater than the area $A_1$. Since the ram to atmospheric pressure ratio is a known function of Mach number, the sensing means can be designed to sense Mach number. By using a pair of diaphragms connected and pressurized in the manner described, it is possible to provide a pressure ratio sensing means which has equal sensitivity at all altitudes, whereas such a sensing means composed of bellows, as has been used in the past, would not provide such equal sensitivity at all altitudes. The principal reason for this is that bellows possess inherent spring rates simply because of the manner in which they are constructed. This inherent spring rate causes the sensitivity of a bellows to decrease as the atmospheric pressure decreases. In other words at higher altitudes the atmospheric forces acting on a bellows are not great enough to compensate for the inherent spring rate in the bellows. Diaphragms, of course, do not have this inherent problem.

A second fluid flow passage connected between the ram pressure source and atmospheric pressure source includes conduit 32, conduit 58, a third orifice or restriction 60 having a predetermined fixed effective flow area, passage 62, chamber 64, a fourth orifice or restriction 66 having a variable effective flow area, passage 68, and conduits 44 and 34. A movable piston 70 is located in chamber 64 for varying the effective flow area of orifice 66 and is operatively connected to the pressure ratio sensing means by a force pin 72 which abuts diaphragm 50 and piston 70. It should be noted that piston 70 is not actually attached to force pin 72 and that the piston has one side thereof subjected to the control pressure ($P_x$) existing between the third and fourth orifices 60, 66 and the other side subjected to atmospheric pressure for reasons to be subsequently explained. The control pressure ($P_x$) is conveyed to fuel regulator 24 by conduit 74 and is the control pressure utilized by the pneumatic circuit of the fuel regulator to control delivery of fuel to the ram jet engine. The control pressure ($P_x$) could also be used to indicate Mach number through means of an indicator movable as a result of the pressure exerted thereon.

Operation of the device will be as follows: Having determined the area ratio of diaphragm 50 to diaphragm 52 for a desired Mach number, it necessarily follows that at a given ratio of ram pressure to atmospheric pressure the application of such pressures and percentage thereof in the manner disclosed will result in a zero differential force on the diaphragm assembly and the assembly would assume a fixed position. The significant thing is that at the selected Mach number the diaphragm assembly is always in the same position regardless of the altitude, since the ratio of ram pressure to atmospheric pressure is a function of Mach number. At the design or selected Mach number, that is, at the design ratio of ram ($P_r$) to atmospheric ($P_0$) pressure, the metering edge of piston 70 will be just flush with the edge of variable orifice 66 so that passage of fluid therethrough will be completely prevented. If the Mach number and associated pressure ratio increases, the diaphragm assembly will move to the right as shown in FIGURE 2. If the Mach number and associated pressure ratio should decrease, the diaphragm assembly will move to the left.

Thus in a given atmosphere, if the speed of the aircraft increases the Mach number and the pressure ratio $P_r/P_0$ will also increase. The diaphragm pressure ratio sensing assembly will sense this pressure ratio change and will move to the right. Piston 70 will then also move to the right since the control presure ($P_x$) which is equal to ram pressure ($P_r$) at this instant is acting on one side of the piston and is greater than the atmospheric pressure ($P_0$) acting on the other side of the piston 70. The opening of variable orifice 66 will permit the bleeding down of the control pressure ($P_x$) of the pneumatic circuit of the fuel regulator with a resultant reduction of fuel flow to the ram jet. If the Mach number and pressure ratio $P_r/P_0$ decreases, the diaphragm assembly will move to the left causing piston 70 via force pin 72 to begin closing off variable orifice 66 until the control pressure ($P_x$) has increased sufficiently to increase the fuel flow to the ram jet in the required amounts until the design Mach number is reached, at which time the diaphragm assembly will once again be in equilibrium. In this manner the control pressure ($P_x$) is increased or decreased as the case may be, said control pressure being utilized through proper mechanism to increase or decrease fuel flow to the ram jet.

It will be obvious that the control pressure ($P_x$) will be equal to ram presure ($P_r$) when piston 70 has closed off the variable orifice 66 for a predetermined interval of time, and could likewise be bled off to equal atmospheric pressure ($P_0$) if piston 70 has opened the variable orifice for a predetermined interval of time. Thus the control pressure can vary anywhere between the ram and atmospheric presures.

The fact that piston 70 does not have balanced pressures acting thereon, but has control pressure ($P_x$) acting on one side thereof and atmospheric pressure ($P_0$) acting on the other side thereof, prevents the sudden complete opening or complete closing of the variable orifice 66. This damping effect provides a progressive adjustment of the variable orifice thereby providing a progressive opening or closing thereof and permits control in the stages between the completely open or closed positions of the piston 70.

It should be noted that an indicator 76 or mechanically positioned device could also be driven by this unit in a manner similar to that shown in FIGURE 3.

Referring to FIGURE 4, it will be noted that another embodiment of the Mach number control device is shown in conjunction with the pneumatic circuit of the fuel regulator which controls delivery of fuel to the ram jet engine. In this figure like parts are given the same numerals as in FIGURE 2 plus 100. Housing 130 of the Mach number control device is connected to a ram pressure source ($P_r$) and a static or atmospheric pressure source ($P_0$) through conduits 132 and 134, which communicate with a pitot tube in a manner previously described. A first fluid flow passage connected between the ram pressure source and atmospheric pressure source includes conduit 132, a first orifice or restriction 138 having a predetermined fixed effective flow area, a second orifice or restriction 142 having a predetermined fixed effective flow area, conduit 144, and conduit 134. Within housing 130 the pressure ratio sensing means includes three variable volume chambers 140, 146 and 148, and two pressure responsive pistons 150 and 152 (instead of diaphragms), the first of which is located between chambers 140 and 146, and the second of which is located between chambers 146 and 148. A connecting rod 154 connects the two pistons so that they will move in unison. The pressure ($P_r/H$) in chamber 140 will be a percentage of ram pressure, said percentage being dependent upon the preselected fixed flow areas of consecutive restrictions 138 and 142. The pressure in chamber 146 is equal to ram pressure ($P_r$) since it comunicates will the ram pressure source via conduit 156, while the pressure in chamber 148 will be equal to atmospheric pressure ($P_0$) since it is in communication with the atmospheric pressure source via conduit 134. The areas $A_2$ and $A_1$ of pistons 150 and 152 have the same relationship as described for diaphragms 50 and 52 of FIGURE 2.

A second fluid flow passage connected between the ram pressure source and atmospheric pressure source includes conduit 132, a third orifice or restriction 160 having a predetermined fixed effective flow area, chamber 174, passage 162, chamber 164, a fourth orifice or restriction 166 having a variable effective flow area, passage 168, and conduits 169 and 134. A movable spool by-pass valve 170 is located in chamber 164 for varying the effective flow area of orifice 166 and is attached to pistons 150 and 152 by connecting rod 172. A passage is located in by-pass valve 170 for balancing the pressures on the opposite ends thereof. A portion of the pneumatic circuit of the fuel regulator is incorporated in housing 130 and includes an air piston 180 which controls fuel metering means (not shown) in the fuel regulator via rod 182. One side of air piston 180 is subjected to the control pressure ($P_x$) existing between the third and fourth orifices 160, 166 and the other side is subjected to atmospheric pressure ($P_0$) via conduit 169. The rod 182 could also be connected to an indicator instead of fuel metering means to indicate Mach number.

The operation of the FIGURE 4 embodiment is quite similar to that of FIGURE 2. In FIGURE 4 the pressure ratio sensing means consisting of pistons 150 and 152 drives spool by-pass valve 170 which controls the pneumatic circuit of the fuel regulator. The fuel regulator will deliver fuel as a function of the force developed by the differential pressure across air piston 180. If, for example, a Mach number of 1.4 is desired, and the areas of pistons 150 and 152 have been selected to correspond with that Mach number, the assembly will assume a position such that the metering edge of the by-pass valve 170 will be just flush with the edge of variable orifice 166 when Mach number 1.4 pressures are applied to pistons 150 and 152. If the Mach number and associated ram/atmospheric pressures increase, the piston assembly and by-pass valve will move to the right, thereby opening variable orifice 166. Such opening of orifice 166 will bleed down the air piston high side pressure ($P_x$) and result in a reduction of fuel meter output. If the Mach number and associated pressure ratio should decrease, the piston assembly and by-pass valve will move to the left. Since in this embodiment the by-pass valve 170 has equal pressures acting on the ends thereof there is no damping effect to provide a progressive adjustment of variable orifice 166. This type of an arrangement will therefore result in an instantaneous on-off control.

Figure 5:
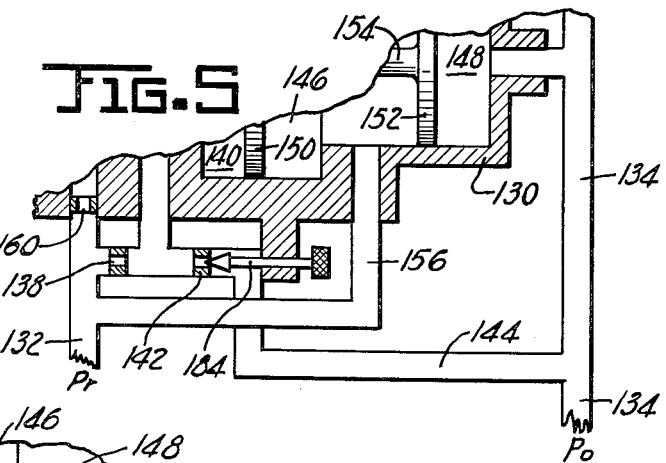
FIGURE 5 is a sectional view of a portion of the Mach number control device of FIGURE 4 which incorporates manual means for changing the Mach number setting.

FIGURE 5 shows a portion of the Mach number control device, the arrangement of which is identical with the FIGURE 4 arrangement, except that provision is made for manually varying the effective flow area of orifice 142 through means of needle valve 184. This allows additional flexibility with one pressure ratio piston or diaphragm design. The control can be manually set to any Mach number desired within a range compatible with the design of the hardware. For example, if the piston or diaphragm assembly being used is for a Mach number of 1.4 and it is desired to change the control Mach number to some other value such as 1.8, then this can be accomplished by use of the FIGURE 5 arrangement. By varying the effective flow area of orifice 142 it is possible to vary the percentage of ram pressure ($P_r/H$) in chamber 140. What is required then, is that when the overall presure ratio ($P_r/P_0$) is equivalent to that for Mach number 1.8 then the percentage of ram ($P_r/H$) in chamall pressure ratio ($P_r/P_0$) is equivalent to that for Mach number 1.4. This can be accomplished by selection of the proper bleed area ratio between restrictions 138 and 142, said ratio being determined from equations for pressure ratio characteristics of restrictions in series.

Figure 6:
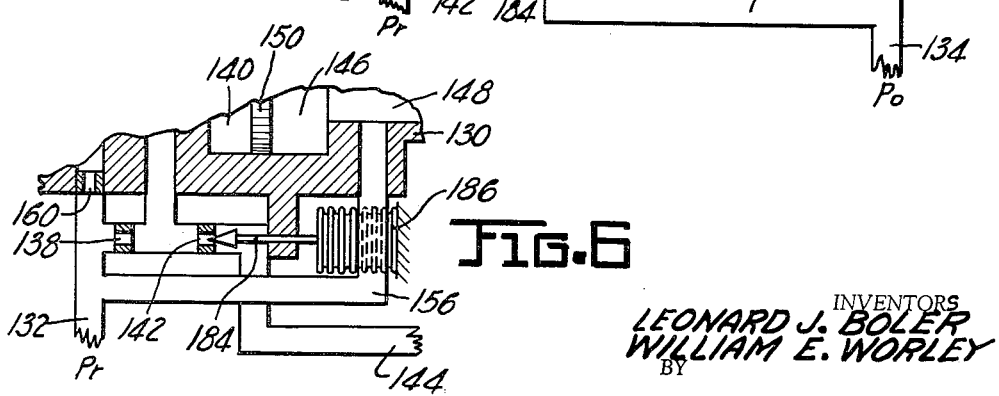
FIGURE 6 is a sectional view of a portion of the Mach number control device of FIGURE 4 which incorporates means for programming the control Mach number in accordance with altitude or atmosphere.

A programmed Mach number unit can be arranged, as shown in FIGURE 6, to provide another form of speed control. In this arrangement, the control Mach number is programmed with altitude or atmospheric pressure. Only a portion of the arrangement is shown, since it is essentially the same as the unit shown in FIGURES 4 and 5. The ingredient that has been added is a bellows driven variable area downstream bleed 142 in the series bleed arrangement 138, 142 which provides pressure to chamber 140. In the previous arrangements the bleed or orifice 142 was fixed or manually varied. In the FIGURE 6 embodiment the flow area of orifice 142 is varied in a prescribed manner by a needle valve 184 which is attached to an evacuated bellows 186 that travels linearly with application of atmospheric pressure. (The bellows is shown only by way of example and other altitude responsive means may be used in place thereof.) At sea level, for instance, the bellows has a fixed position which results in a given area ratio of bleed 138 to bleed 142 in the series bleed arrangement. This determines the Mach number at which the control will respond. As the altitude increases, the bellows travels in a direction to open the downstream bleed or orifice 142 and increase the area ratio of bleed 138 to bleed 142, thereby demanding that a higher overall pressure ratio exist across the bleed system to produce the needed pressure conveyed to chamber 140. Thus as altitude increases, the control Mach number increases also.

Although this invention has been described in connection with certain specific embodiments, it should be understood that various changes in the form and relative arrangements of the parts may be made to suit requirements and that the principles are susceptible of numerous other applications that will readily occur to persons skilled in the art.

Having thus described the various features of the invention, what we claim as new and desire to secure by Letters Patent is:

1. A pressure control device comprising a first fluid flow passage connected between first and second sources of fluid pressure, a second fluid flow passage connected between said first and second sources of fluid pressure, first and second orifices located in said first passage in series flow relationship, said first and second orifices each having predetermined fixed effective flow areas with sonic flow therethrough, third and fourth orifices located in said second passage in series flow relationship, said third orifice having a predetermined fixed effective flow area, said fourth orifice having a variable effective flow area, means for varying the effective flow area of said fourth orifice, said last named means comprising a pressure responsive element having one side thereof exposed to the pressure existing between said third and fourth orifices and the other side thereof exposed to atmospheric pressure, a pressure ratio sensing means communicating with said first and second sources of fluid pressure, means operatively connecting said pressure ratio sensing means with said means for varying the effective flow area of said fourth orifice, and means responsive to the variable pressure existing between said third and fourth orifices.

2. A Mach number control device for controlling fuel flow to a ram jet engine comprising first and second fluid flow passages connected between a ram pressure source and an atmospheric pressure source, first and second orifices located in said first passage in series flow relationship, said first and second orifices each having predetermined fixed effective flow areas with sonic flow therethrough, third and fourth orifices located in said second passage in series flow relationship, said third orifice having a predetermined fixed effective flow area, said fourth orifice having a variable effective flow area, means for varying the effective flow area of said fourth orifice, said last named means comprising a pressure responsive element having one side thereof exposed to the pressure existing between said third and fourth orifices and the other side thereof exposed to atmospheric pressure, a pressure ratio sensing means, said sensing means including a housing having first, second, and third chambers formed therein, a first pressure responsive member having a predetermined effective pressure responsive area disposed between said first and second chambers, a second pressure responsive member having a predetermined effective pressure responsive area disposed between said second and third chambers, said effective area of said first member being larger than said effective area of said second member, means for connecting said first member to said second member, passage means for communicating said first chamber to the pressure existing between said first and second orifices, passage means for communicating said second chamber with said ram pressure source, passage means for subjecting said third chamber with said atmospheric pressure source, means operatively connecting said pressure ratio sensing means with said means for varying the effective flow area of said fourth orifice, and means for regulating fuel flow to said ram jet engine, said last named means being responsive to the variable pressure existing between said third and fourth orifices.

3. A pressure control device comprising a first fluid flow passage connected between first and second sources of fluid pressure, a second fluid flow passage connected between said first and second sources of fluid pressure, first and second orifices located in said first passage in series flow relationship, said first orifice having a predetermined fixed effective flow area with sonic flow therethrough, said second orifice having a variable effective flow area with sonic flow therethrough, means for varying the effective flow area of said second orifice as a function of altitude, third and fourth orifices located in said second passage in series flow relationship, said third orifice having a predetermined fixed effective flow area, said fourth orifice having a variable effective flow area, means for varying the effective flow area of said fourth orifice, said last named means comprising a pressure responsive element having one side thereof exposed to the pressure existing between said third and fourth orifices and the other side thereof exposed to atmospheric pressure, a pressure ratio sensing means, said sensing means including a housing having first, second and third chambers formed therein, a first pressure responsive member located between said first and second chambers, a second pressure responsive member located between said second and third chambers, said first pressure responsive member having greater effective areas than said second pressure responsive member, means for connecting said first member to said second member, passage means for communicating said first chamber with the pressure existing between said first and second orifices, passage means for communicating said second chamber with said first source of fluid pressure, passage means for subjecting said third chamber with said second source of fluid pressure, means operatively connecting said pressure ratio sensing means with said means for varying the effective flow area of said fourth orifice, and means responsive to the variable pressure existing between said third and fourth orifice, said last mentioned means being positioned as a function of said last mentioned variable pressure.

4. A Mach number control device for controlling fuel flow to a ram jet engine comprising first and second fluid flow passages connected between a ram pressure source and an atmospheric pressure source, first and second orifices located in said first passage in series flow relationship, said first orifice having a predetermined fixed effective flow area with sonic flow therethrough, said second orifice having a variable effective flow area with sonic flow therethrough, means for varying the effective flow area of said second orifice as a function of altitude, third and fourth orifices located in said second passage in series flow relationship, said third orifice having a predetermined fixed effective flow area, said fourth orifice having a variable effective flow area, means for varying the effective flow area of said fourth orifice, said last named means comprising a pressure responsive element having one side thereof exposed to the pressure existing between said third and fourth orifices and the other side thereof exposed to atmospheric pressure, a pressure ratio sensing means, said sensing means including a housing having first, second, and third chambers formed therein, a first pressure responsive member having a predetermined effective pressure responsive area disposed between said first and second chambers, a second pressure responsive member having a predetermined effective pressure responsive area disposed between said second and third chambers, said effective area of said first member being larger than said effective area of said second member, means for connecting said first member to said second member, passage means for communicating said first chamber with the pressure existing between said first and second orifices, passage means for communicating said second chamber with said ram pressure source, passage means for communicating said third chamber with said atmospheric pressure source, means operatively connecting said pressure ratio sensing means with said means for varying the effective flow area of said fourth orifice, and means for regulating fuel flow to said ram jet engine, said last named means being responsive to the variable pressure existing between said third and fourth orifices.

5. A Mach number control device for controlling fuel flow to a ram jet engine comprising first and second fluid flow passages connected between a ram pressure source and an atmospheric pressure source, first and second orifices located in said first passage in series flow relationship, said first orifice having a predetermined fixed effective flow area with sonic flow therethrough, said second orifice having a variable effective flow area with sonic flow therethrough, means for varying the effective flow area of said second orifice as a function of altitude, third and fourth orifices located in said second passage in series flow relationship, said third orifice having a predetermined fixed effective flow area, said fourth orifice having a variable effective flow area, means for varying the effective flow area of said fourth orifice, said last named means comprising a pressure responsive element having one side thereof exposed to the pressure existing between said third and fourth orifices and the other side thereof exposed to atmospheric pressure, a pressure ratio sensing means communicating with said ram pressure source and said atmospheric pressure source, means operatively connecting said pressure ratio sensing means with said means for varying the effective flow area of said fourth orifice, and means for regulating fuel flow to said ram jet engine, said last named means being responsive to the variable pressure existing between said third and fourth orifices.

6. A pressure control device comprising a first fluid flow passage connected between first and second sources of fluid pressure, a second fluid flow passage connected between said first and second sources of fluid pressure, first and second orifices located in said first passage in series flow relationship, said first orifice having a predetermined fixed effective flow area with sonic flow therethrough, said second orifice having a variable effective flow area with sonic flow therethrough, means for varying the effective flow area of said second orifice as a function of altitude, third and fourth orifices located in said second passage in series flow relationship, said third orifice having a predetermined fixed effective flow area, said fourth orifice having a variable effective flow area, means for varying the effective flow area of said fourth orifice, said last named means comprising a pressure responsive element having one side thereof exposed to the pressure existing between said third and fourth orifices and the other side thereof exposed to atmospheric pressure, a pressure ratio sensing means communicating with said first and second sources of fluid pressure, means operatively connecting said pressure ratio sensing means with said means for varying the effective flow area of said fourth orifice, and means responsive to the variable pressure existing between said third and fourth orifices, said last mentioned means being positioned as a function of said last mentioned variable pressure.

7. A Mach number control device for controlling fuel flow to a ram jet engine comprising first and second fluid flow passages connected between a ram pressure source and an atmospheric pressure source, first and second orifices located in said first passage in series flow relationship, said first and second orifices each having predetermined fixed effective flow areas with sonic flow therethrough, third and fourth orifices located in said second passage in series flow relationship, said third orifice having a predetermined fixed effective flow area, said fourth orifice having a variable effective flow areas, means for varying the effective flow area of said fourth orifice, said last named means comprising a pressure responsive element having one side thereof exposed to the pressure existing between said third and fourth orifices and the other side thereof exposed to atmospheric pressure, a pressure ratio sensing means, said sensing means including a housing having a chamber formed therein, said ram and atmospheric pressure sources communicating with said chamber, first and second pressure responsive members disposed in said chamber, said first pressure responsive member having greater effective areas than said second pressure responsive member, means connecting said first and second members, one side of said first member communicating and being exposed to the pressure existing between said first and second orifices, passage means for communicating the other side of said first member and one side of said second member with said ram pressure source, passage means for communicating the other side of said second member with said atmospheric pressure source, means operatively connecting said pressure ratio sensing means with said means for varying the effective flow area of said fourth orifice, and means for regulating fuel flow to said ram jet engine, said last named means being responsive to the variable pressure existing between said third and fourth orifices.

References Cited in the file of this patent
UNITED STATES PATENTS

| | | |
|---|---|---|
| 2,642,237 | Page et al. | June 16, 1953 |
| 2,645,240 | Drake | July 14, 1953 |
| 2,671,620 | Andrews | Mar. 9, 1954 |
| 2,775,231 | Silver | Dec. 25, 1956 |
| 2,804,084 | Greenland | Aug. 27, 1957 |
| 2,851,230 | Greenland et al. | Sept. 9, 1958 |
| 2,864,393 | Drake | Dec. 16, 1958 |
| 2,872,133 | Seeger | Feb. 3, 1959 |
| 2,882,680 | Jamison et al. | Apr. 21, 1959 |
| 2,886,968 | Johnson et al. | May 19, 1959 |

OTHER REFERENCES

Garrett Corporation Engineering Symposium: "Airsearch Pneumatic Controls for Future Aircraft and Missile Applications," published by The Garrett Corporation Airsearch Manufacturing Division; Phoenix, Arizona, April 8, 1957; pages 47–49 relied on.

UNITED STATES PATENT OFFICE

CERTIFICATE OF CORRECTION

Patent No. 3,021,670                      February 20, 1962

Leonard J. Boler et al.

It is hereby certified that error appears in the above numbered patent requiring correction and that the said Letters Patent should read as corrected below.

Column 2, line 35, for "retriction" read -- restriction --; column 4, line 16, for "presures" read -- pressures --; column 5, lines 53 and 54, for "chamall pressure ratio ($P_r/P_o$) is equivalent to that" read -- chamber 140 should be the same as it previously was --; column 7, line 42, for "orifice" read -- orifices --; column 8, line 65, for "betwen" read -- between --.

Signed and sealed this 31st day of July 1962.

(SEAL)
Attest:

ERNEST W. SWIDER                      DAVID L. LADD
Attesting Officer                      Commissioner of Patents